United States Patent
Becerra

(10) Patent No.: US 12,529,617 B1
(45) Date of Patent: *Jan. 20, 2026

(54) METHOD OF IDENTIFYING AND DETECTING A PIPE CONTAINING AN UNDERGROUND LEAK

(71) Applicant: Philip Becerra, Ventura, CA (US)

(72) Inventor: Philip Becerra, Ventura, CA (US)

( * ) Notice: Subject to any disclaimer, the term of this patent is extended or adjusted under 35 U.S.C. 154(b) by 474 days.

This patent is subject to a terminal disclaimer.

(21) Appl. No.: 18/095,406

(22) Filed: Jan. 10, 2023

Related U.S. Application Data

(63) Continuation-in-part of application No. 17/745,976, filed on May 17, 2022, now Pat. No. 11,598,689.

(60) Provisional application No. 63/271,202, filed on Oct. 24, 2021.

(51) Int. Cl.
| | |
|---|---|
| *G01M 3/00* | (2006.01) |
| *G01K 13/02* | (2021.01) |
| *G01N 25/72* | (2006.01) |
| *G01M 3/24* | (2006.01) |

(52) U.S. Cl.
CPC ........... *G01M 3/002* (2013.01); *G01K 13/026* (2021.01); *G01N 25/72* (2013.01); *G01M 3/243* (2013.01)

(58) Field of Classification Search
CPC ...... G01M 3/002; G01M 3/243; G01N 25/72; G01K 13/026
See application file for complete search history.

(56) References Cited

U.S. PATENT DOCUMENTS

| | | | |
|---|---|---|---|
| 1,906,636 | A | 5/1933 | Schlecker |
| 4,308,746 | A | 1/1982 | Covington |
| 4,336,708 | A | 6/1982 | Hobgood et al. |
| 4,529,974 | A | 7/1985 | Tanaka et al. |
| 5,228,329 | A | 7/1993 | Dennison |
| 5,416,724 | A | 5/1995 | Savic |
| 5,637,789 | A | 6/1997 | Lawson |
| 5,675,506 | A | 10/1997 | Savic |
| 5,883,815 | A | 3/1999 | Drakulich |
| 6,147,613 | A | 11/2000 | Doumit |
| 6,547,435 | B1 | 4/2003 | Grosswig |
| 6,883,369 | B1 | 4/2005 | Myhre |

(Continued)

FOREIGN PATENT DOCUMENTS

| | | |
|---|---|---|
| CN | 1301339 A | 6/2001 |
| CN | 114018500 A | 2/2022 |

(Continued)

*Primary Examiner* — Randy W Gibson
(74) *Attorney, Agent, or Firm* — Bold IP, PLLC; Houda El-Jarrah

(57) ABSTRACT

A method of detecting and identifying leaks in a pipeline on a manifold that connects to a leaking underground pipe for properties having a slab or other type of foundation with a plurality of manifolds utilized to distribute water. The method includes turning off the water to the main water entrance of the property. Next, the method includes identifying a first manifold to test after waiting a period of time, heating up each pipeline evenly, and comparing the temperature of the pipelines that were heated. If a pipe has a leak, the water remaining in the pipe will drain towards the underground leak and will not remain in the pipe, and the exterior of the pipe will be hotter than a pipe containing any water. In this way, the method discloses identifying a pipeline of a manifold that leads to an underground leak.

10 Claims, 5 Drawing Sheets

(56) References Cited

U.S. PATENT DOCUMENTS

| | | | |
|---|---|---|---|
| 9,500,554 B2 | 11/2016 | Kulkarni et al. | |
| 10,364,555 B2 | 7/2019 | Trescott | |
| 10,458,825 B2 | 10/2019 | Ozaki et al. | |
| 10,563,382 B1 | 2/2020 | Leverich et al. | |
| 10,704,979 B2 | 7/2020 | Bailey | |
| 2004/0059505 A1 | 3/2004 | Gallagher | |
| 2012/0170610 A1 | 7/2012 | Ramos | |
| 2013/0197846 A1 | 8/2013 | Kuroda | |
| 2014/0067268 A1 | 3/2014 | Tunheim | |
| 2015/0192489 A1 | 7/2015 | Decker | |
| 2015/0247777 A1 | 9/2015 | Kondou | |
| 2015/0355045 A1 | 12/2015 | Solomon | |
| 2018/0058891 A1 | 3/2018 | Easey et al. | |
| 2018/0321385 A1 | 11/2018 | Embry | |
| 2019/0025148 A1 | 1/2019 | Tombak | |
| 2019/0331301 A1 | 10/2019 | Du et al. | |
| 2019/0390990 A1 | 12/2019 | Krywyj et al. | |
| 2021/0088405 A1 | 3/2021 | Connor | |
| 2021/0318202 A1 | 10/2021 | Livesay | |
| 2023/0221206 A1* | 7/2023 | Rosen | G01M 3/243 73/40.5 A |
| 2024/0302222 A1* | 9/2024 | Shi | G01K 13/026 |
| 2025/0012655 A1* | 1/2025 | Cho | G01M 3/002 |

FOREIGN PATENT DOCUMENTS

| | | |
|---|---|---|
| CN | 113029443 B | 3/2022 |
| CN | 114397403 A | 4/2022 |
| DE | 19509129 C2 | 7/1998 |
| JP | 4615783 B2 | 1/2011 |
| WO | 8805530 A1 | 7/1988 |
| WO | 2022101628 A1 | 5/2022 |

* cited by examiner

METHOD OF IDENTIFYING AND DETECTING A PIPE CONTAINING AN UNDERGROUND LEAK

CROSS-REFERENCE TO RELATED APPLICATIONS

This application is a continuation in part application which claims priority to U.S. Non-Provisional patent application Ser. No. 17/745,976 filed on May 17, 2022, which claimed priority to U.S. Provisional Patent Application No. 63/271,202, which was filed on Oct. 24, 2021, both of which are incorporated by reference herein in their entirety.

FIELD OF THE DISCLOSURE

The present invention relates to a system and method for detecting and identifying underground leaking pipes. Specifically, the method and system correctly detect and identify a specific manifold comprising a pipeline that enters a slab or foundation which may contain a leak in an underground pipe connected to the manifold. This identification helps a property owner determine what type of repairs are needed to correct the issues associated with the leak and helps to minimize expenses associated with such repairs as well as minimizes damage to existing property walls or floors involved in opening up walls to reach the various manifolds that may need testing to determine a location of the underground leaking pipe. In particular, the method and system provided herein may assist a property owner determine exactly which pipe is leaking so that the leaking pipe can be replaced or repaired including providing rerouting of pipes overhead in the property.

BACKGROUND

It is a little-known fact that plumbers are not always able to correctly identify which pipe in a home or other commercial property is leaking. This is especially true for leaks that may be occurring underground. The term "underground" as used herein refers to a leak that is occurring in a pipe located beneath a slab or foundation of a property. Understandably, the property owner wants to minimize any digging up and jackhammering of walls or floors in the property in order to find underground leaking pipes. With above ground pipes, it is easier to determine if there is a leak because the plumber or other detector can see water flowing out of a hole or other break in an above ground pipe even if the plumber or other detector has to expose one or more pipes behind walls or other property surfaces. This is not the case with underground leaking pipes.

With underground leaking pipes, the leak detecting companies have to identify specific manifolds that may be affected by the leak. Manifolds are a collection of one or more pipelines fitted together with distribution and feed lines (with very few specific types of manifolds that only have distribution lines such as a main water inlet manifold) that distribute hot or cold water throughout the house. It is known that the manifolds will always protrude above ground and will be accessible from the walls of a property. The customer may want to minimize damage to their walls and property when the plumber or other specialized individual is looking for an exact source of a leak.

Leak detection companies sometimes employ audio equipment to attempt to listen to "hissing" sounds below the ground to try and locate where a leak may likely be in the underground pipes and may utilize one or more utility locators, also known as pipe and cable locators, that can help the technician detect where pipes are running underground in a home or other property. There may be other clear signs to indicate where a leak may be occurring including flooding in a particular area or warm floors. However, other than that, most leak detection companies are very secretive in their method regarding how they determine where a leak is occurring in a specific pipe. Some leaks are caused by a small hole that may be no bigger than a size of a pin in a pipe, while others may be much bigger holes or cracks in a pipe. In either case, conventional methods offer no simple way to identify which pipe is leaking.

It is noted that there is no official leak detection certification course or process currently. States do not have such a certification process. Rather, people are trained on the job through other professionals. Notably, many mistakes happen in the detection process using conventional methods. Usually, anyone hired to try and identify a leak is most commonly going to try to listen to a leak using audio equipment, however, this practice leads to many errors and can lead to incorrect pipes marked as being the pipe containing the leak. Mistakes frequently occur when someone solely utilizes audio equipment to try and detect a source of a leak or through trial and error, and it is very expensive to correct these mistakes.

Accordingly, there is still an unsolved need for a system and method for accurately identifying which manifold pipeline leads to an underground leaking pipe on a property.

SUMMARY

A method for identifying an underground pipe containing a leak at a property is described herein. The method may include ensuring that a main water inlet valve to the property is shut off and that potable water is not able to flow into the property if any water fixtures are opened or turned on. After ensuring that the main water inlet valve to the property is shut off, the method may include opening or turning on all water fixtures on the property thereby allowing air to enter into the pipelines allowing water to drain. It is noted that this step of opening or turning on all water fixtures to allow air to entire the pipelines may be a preferred, best practice step, but is not required as water will still drain on its own without the implementation of this step.

Next, the method may include waiting for a period of time to allow the water in the pipelines on the property to drain and then identifying a first manifold to test on the property, wherein the first manifold comprises a set of manifold pipelines to begin testing to identify a location of and detect the underground leaking pipe. The method may include optionally cleaning each manifold pipeline of the set of manifold pipelines and heating up each manifold pipeline of the set of manifold pipelines evenly using a heating tool. The method may include after heating up each manifold pipeline, reading a temperature of each manifold pipeline and comparing the temperature of each manifold pipeline to each other. If a single manifold pipeline of the set of manifold pipelines of the first test manifold is hotter than other manifold pipelines of the set of manifold pipelines, the method includes determining that the manifold single pipeline does not contain water which is an indication that any water remaining in the single manifold pipeline has escaped through the manifold pipeline to the underground pipe containing the leak on the property. Next, upon successfully identifying a manifold pipeline that does not appear to contain any water and is hotter than the other manifolds that have been heated, the method may include marking the single manifold pipeline of the first manifold with a visible marker.

If the single manifold pipeline of the set of manifold pipelines of the first test manifold is not hotter than the other manifold pipelines of the set of manifold pipelines, the method may include determining that all of the manifold pipelines of the set of manifold pipelines of the first test manifold contain water even when the potable water to the property is shut off and that the first manifold does not include a manifold pipeline leading to the underground pipe containing the leak at the property. Accordingly, the steps described need to be repeated on additional manifolds on the property to test until a correct manifold is identified having a manifold pipeline that reads hotter than other manifold pipelines of the correct manifold after being heated and identifying the manifold pipeline of the correct manifold as leading to the underground pipe containing the leak at the property. The method may include marking the manifold pipeline of the correct manifold as leading to the underground pipe containing the leak at the property.

In a non-limiting embodiment, the heating tool comprises a torch or heat gun or another heating tool. The step for reading a temperature may further comprise using touch, vision, or temperature testing equipment. The temperature testing equipment further comprises using thermometers, cameras, or temperature readers. The step to test the temperature of the pipelines using touch may further comprise feeling each manifold pipeline in a manifold with a user's hands or other part of a user's body to assess a temperature of each manifold pipeline.

In a non-limiting embodiment, identifying a first manifold to test further comprises checking for any clear signs of where the leak could be located and proceeding to an identified location on the property having the water fixtures and manifolds closest to a location of the any clear signs, wherein the any clear signs comprise flooding, pooling water, warm floors, hissing noises that can be heard with a user's bare ears, or a loud sound detected using audio equipment. The method may include using audio equipment to identify the first manifold or the additional manifolds to test on the property and further comprises listening for a loud hissing side using the audio equipment.

In a non-limiting embodiment, the step for optionally cleaning each pipeline may comprise using a file, emery cloth, a piece of sand paper, wire brush, or other tool to clean off any sludge, slime, concrete, plastic or any other unwanted elements that interfere with obtaining an accurate temperature reading.

Additionally, the method may include utilizing a utility locator to locate pipes located underground the slab or the foundation in order to determine the first manifold to test or the additional manifolds to test on the property.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

The present disclosure is generally drawn to various embodiments for detecting leaking pipes that are underground, including those leaking pipes that are either beneath a surface of a slab or other type of foundation or that are even/level with the slab or other type of foundation. The method of identifying which pipe is leaking includes determining that there may be a leak on a property and working through a series of steps to identify and locate a detected manifold having a pipeline that connects to an underground pipe containing a leak. The method may include, in part, turning off the water to the water main entrance of the house, and heating each pipeline on a manifold to determine whether a pipeline does or does not have any standing water remaining in the pipeline after the water to the property has been turned off at the main entrance. The additional steps to the method are described further below with respect to the Figures.

Figure 1:
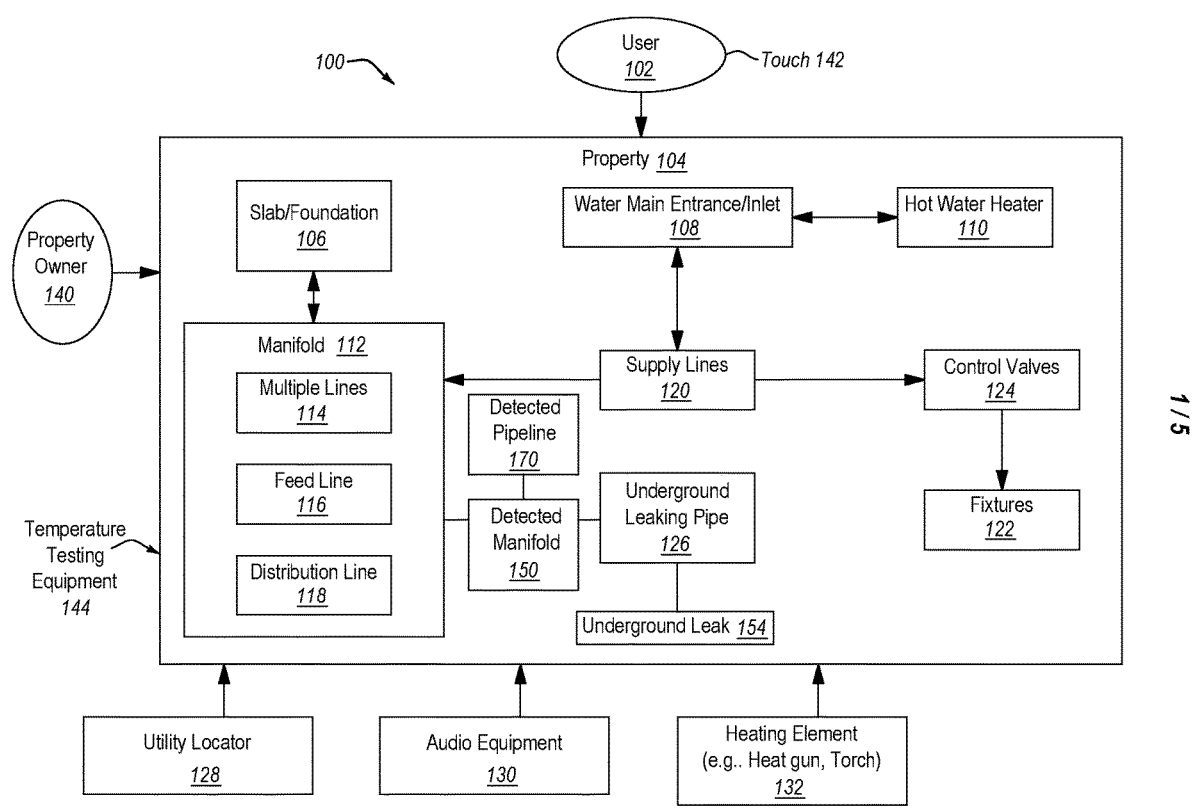
FIG. 1 is a block diagram for a system and method for identifying and detecting leaks that are level or below a slab or other type of foundation for a property.
Figure 2:
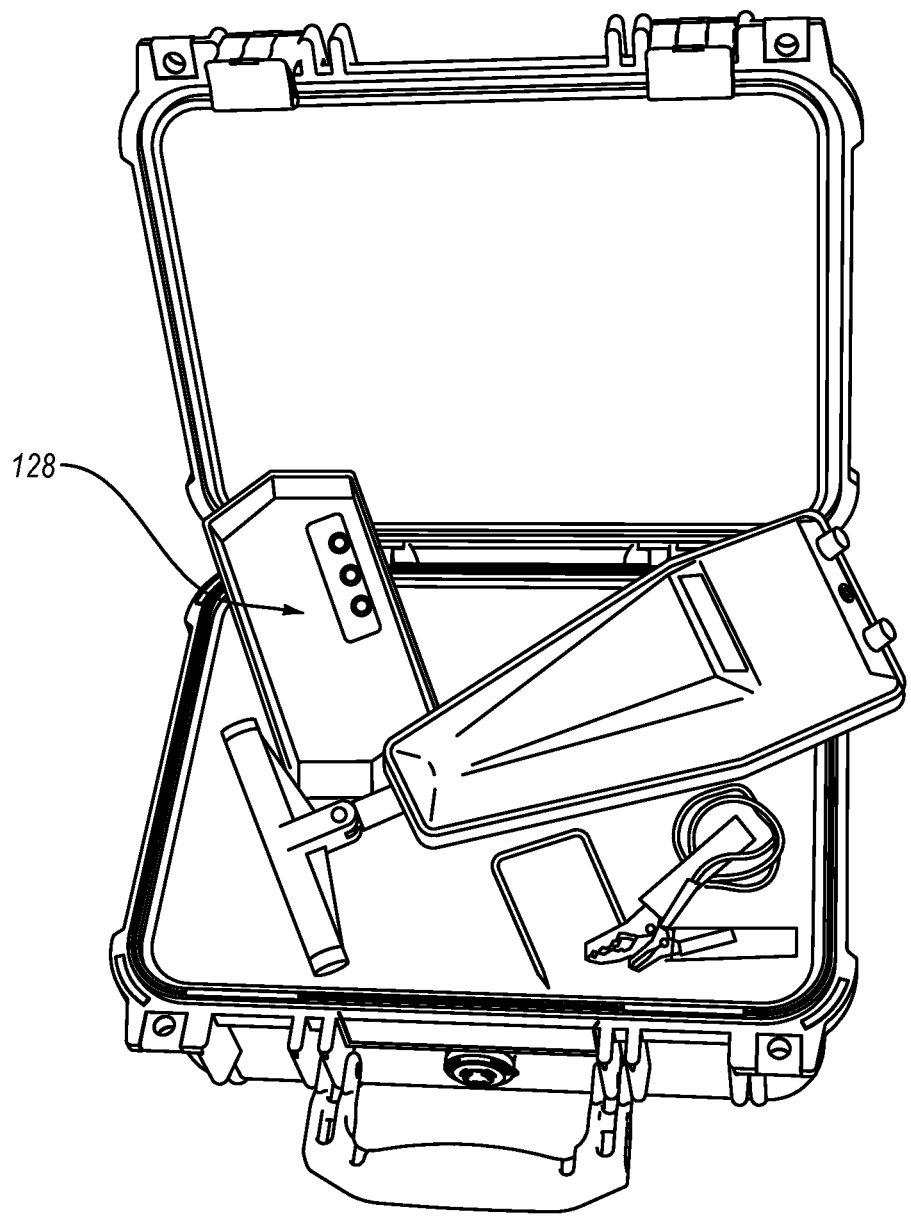
FIG. 2 is a pictorial illustration of an exemplary prior art locator.

FIG. 1 shows an exemplary block diagram of one or more components used to detect and identify one or more underground pipes that contain a leak using method 100. The method 100 as used herein relates to underground leaks that are even or under a slab/foundation 106. In some instances, the slab or foundation 106, as noted above, may refer to the concrete foundation of a home or other type of property such as property 104. In other instances, the slab or foundation 106 may not be made of concrete and may be made of a variety of other materials. A slab 106 is usually made from concrete especially for home residences, however, slabs 106 do not have to be made from concrete. Sometimes slabs 106 are made from dirt or brick or a combination of materials. The term "foundation" may interchangeably be used herein for slab 106.

Notably, the method as described herein in one or more non-limiting embodiments may be applied to any type of property 104, regardless of whether the property 104 is a residential or commercial property 104, as long as the property 104 utilizes a slab or foundation 106 and uses manifolds 112, as shown in FIG. 1, to distribute water throughout the property 104 through the manifolds 112 and series of connected pipelines 114. It is noted that the terms "pipelines," "pipes," and "lines" may be interchangeably used throughout the present description.

The method 100 as shown in FIGS. 1-5 and further described below enables a user 102 to logically and efficiently detect a detected manifold 150 containing a detected pipeline 170 that leads to an underground leaking pipe 126 having an underground leak 154.

As noted above, manifolds 112 act as distribution centers. A manifold as used herein may be include one pipeline or more than one pipeline.

Figure 4:
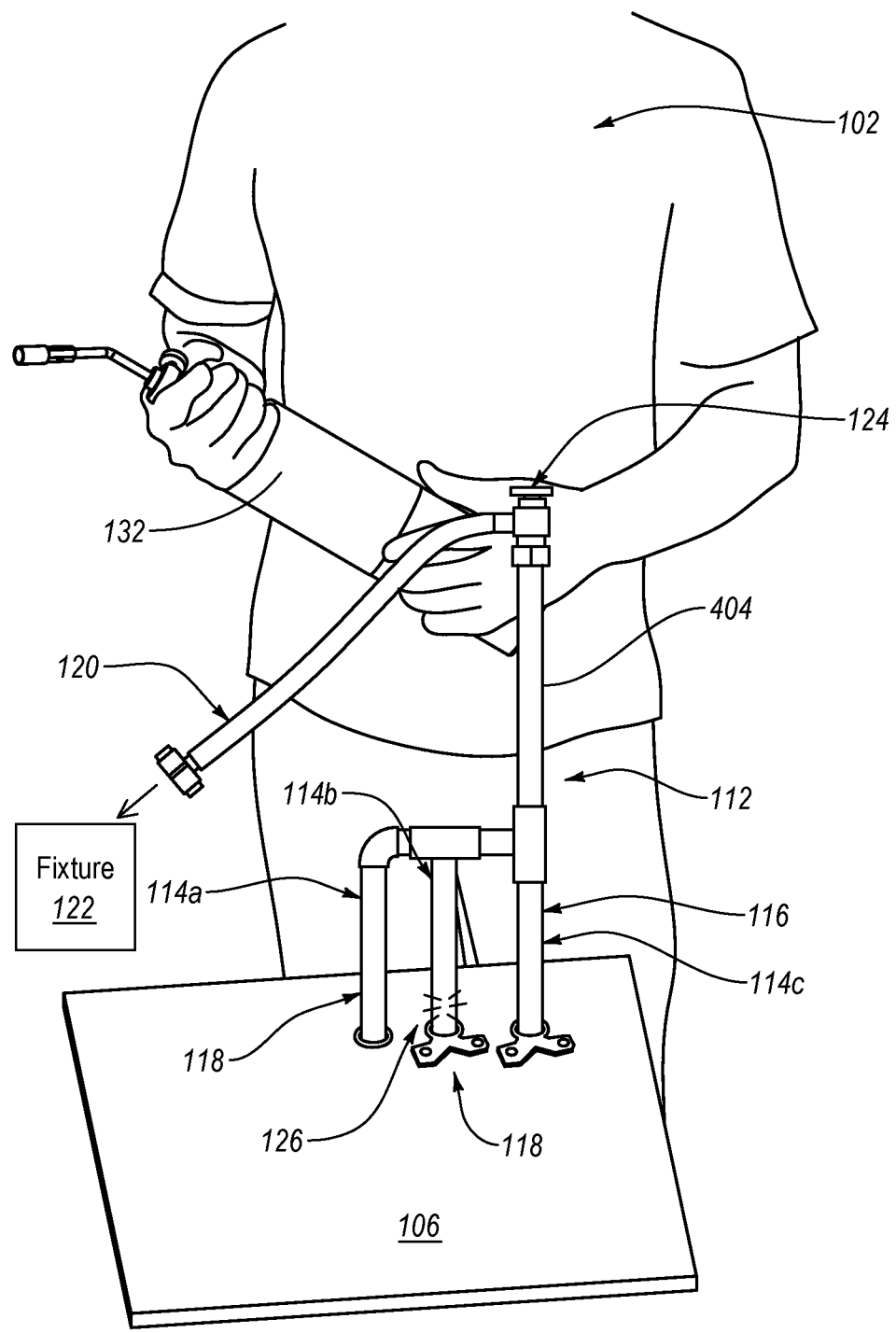
FIG. 4 is a pictorial illustration of an exemplary manifold having multiple pipelines on which a cold-water temperature test is performed to identify a leak.

FIG. 4 provides an example of a manifold 112 having three manifold pipelines 114, shown as manifold pipelines 114a, 114b, 114c that protrude above the exemplary foundation 106 and that distribute water throughout the property 104 to specific fixtures 122. Notably, manifolds 112 connect to the pipes 114 that run underground beneath the slab or foundation 106. The term "underground" as used herein refers to any pipes running beneath the topical surface of the slab 106 or that are even or level with a slab 106, while the term "overground" or "aboveground" refers to anything above the topical surface of the slab or foundation 106. Accordingly, as further discussed below, a client or customer of user 102 may want to reroute a new pipe or set of pipes to run overground meaning to run a new pipe that runs above the slab or foundation 106 rather than repairing or replacing an underground leaking pipe 126 running under or level with the slab or foundation 106 in some cases. In other cases, the property owner 140 may prefer to repair all or a portion of the underground leaking pipe 126. The underground leak 154 is contained within a single pipeline that is made up of a single pipeline that has an underground portion that is shown in FIG. 1 as the underground leaking pipe 126. Connected to the underground leaking pipe 126 is a pipeline 114 on a manifold 112 that can be identified using the method 100 as described herein. The one or more non-limiting embodiments for identifying the underground leaking pipe 126 as described herein is focused on identifying not just that there is an underground leak 154, but specifically, on identifying and marking a pipeline 114 on a manifold 112, shown as the detected pipeline 170 on a detected manifold 150, that leads to or connects to the underground leak 154 and to the underground leaking pipe 126.

It is noted that a feedline 116, as shown in FIG. 1, is a pipeline 114 of a manifold 112 in which water flows up and feeds a fixture 122 on the property 104. Further, a distribution line 118, as shown in FIG. 4, is a pipeline 114 of a manifold 112 in which water flows down.

The user 102, in one or more non-limiting embodiments, may be a specialized technician and/or tester with either extensive knowledge or training in plumbing and leak detection. The user 102 may be separate from the property owner 140, as shown in FIG. 1, in one or more non-limiting embodiments. In other embodiments, the user 102 and the property owner 140 may be the same person if the property owner 140 uses the disclosed method herein to detect the underground leaking pipe 126 on the property 104. As noted above, the method described herein is not publicly known or understood or utilized by existing plumbers or specialized leak detection companies. Rather, plumbers currently usually have to hire a specialized leak detection company with specialized knowledge in locating where the leak 154 is underground. Such leak detecting companies frequently have problems in accurately identifying where the leak 154 is located.

The method as presented herein allows the user to identify with accuracy a specific manifold 112 (i.e., detected manifold 150) and a specific manifold pipeline 114 (i.e., detected pipeline 170) leading to the underground leaking pipe 126 containing a leak 154. A property owner 140 may subsequently be enabled to replace a portion of the underground leaking pipe 126 if so desired or alternatively install rerouted pipelines.

As noted above, and as shown in FIG. 4, manifolds 112 typically have one or more pipelines 114. It is common for most manifolds 112 on a property 104 to comprise at least two pipelines 114 that feed and/or distribute water from the manifold 112 to another location such as from the main water entrance/inlet 108, from the hot water heater 110, or to a fixture 122. Manifolds 112 can have one, two, three, or more pipelines 114. In the example shown in FIG. 4, the manifold 112 has three pipelines 114a, 114b, and 114c. One of the pipelines 114 transports water through the riser 404 shown in FIG. 4 to the fixture 122 through the control valve 124 and supply line 120 the fixture 122 coupled to the manifold 112. In some cases, manifolds 112 may include two pipelines up to four or five or a greater number of pipelines without limitation. The pipelines 114 can connect to fixtures 122 and/or enter or exit from the slab or foundation 106 and carry water where needed on the property 104.

Manifolds 112 are usually made of metal pipes distributed above ground and arranged in a manner where one or more pipelines 114 come up out of the slab or foundation 106 and feed or direct flowing water from the main water inlet 104 and/or hot water heater 110 to one or more fixtures 122 on the property 104. The pipelines 114 of the manifolds 112 connect to the underground pipes beneath the slab or foundation 106, including connecting to an underground leaking pipe 126 and to other manifolds 112. Notably, manifolds 112 may be distributed all throughout the property 104 and not just at the main water inlet 104 or hot water heater 110 and may normally be found throughout the property 104 at water fixtures 122.

A fixture 122 as used herein refers to units in a property 104 that require water to be distributed to the fixture 122 to function or operate. Common examples of fixtures 122 include hot water heaters, washing machines, dish washers, sinks, toilets, showers, and hose bibs, which can all be selectively turned on and/or off in order to provide hot or cold water to the user. It is typically true that manifolds 112 are located next to or near the fixtures 122 that the manifolds 112 connect to and provide water to. Normally, manifolds 112 are connected to fixtures 122 on the property 104. The manifolds 112 usually always have water flowing at least up one pipeline 114 and down another pipeline 114. In a majority of cases, water flows up one pipeline 114 of a manifold 112, which is known as the feedline 116, and down any other pipelines 114, which are known as distribution lines 118.

Manifolds 112 are usually positioned behind walls and/or excess cavities of the property 104 and near the fixtures that the manifolds 112 feed water to. To access them, the user 102 has to cut a portion of a wall surface of the property 104 to access a specific manifold 112. In some cases, the user 102 gets lucky and the manifold 112 may be behind an access panel or an HVAC vent whereby the user 102 can unscrew or remove the vent to access such a manifold 112. It is more common though that the user 102 has to cut into the walls of the property 104 when the user 102 is attempting to detect and correctly and accurately identify an underground leaking pipe 126 that contains a leak 154 on the property 104. This is one of the reasons why the method 100 as described herein, according to one or more non-limiting embodiments, is highly desirable because this method 100 is unknown to the public, yet, it greatly assists the user 102 to relatively quickly identify the source of the underground leaking pipe 126 and reduces the amount of damage and repair required afterwards to the walls of a property 104 (and/or floor surfaces) and minimizes the cost to the property owner 140.

It is a known principle in plumbing that larger pipes 114 feed smaller pipes 114. Accordingly, if there is a pipe 114 on a manifold 112 that has a thicker diameter and is larger in its diameter than all the other pipelines 114 of the same manifold 112, it is safe to assume that the thicker or larger pipe 114 is a feed line 116 and is feeding water to a fixture 122. Further, it is safe to assume the water is flowing up that feedline 116 and that the other pipelines are distribution lines 118 in which water is flowing down to take the flowing water through underground pipes 114 to other manifolds 112 and other fixtures 122 in the property 104. It is noted that in some cases there are manifolds 112 that may have multiple (e.g., at least two) larger sized diameter pipelines 114 and then one or more smaller diameter pipelines 114. In such a case, the user 102 cannot safely assume which is the feedline 116 because there is not just one larger size diameter pipe but rather there are multiple larger sized pipes. In such a case, the user 102 has to perform a time-based temperature check and selectively turn on the associated fixture 122 with that particular manifold 112 to determine with accuracy which larger size pipe is the feed line 116 and which are the distribution lines 114 in order to know whether water is flowing up or down a particular pipeline 114 of a particular manifold 112. It is noted that if there are multiple larger sized diameter pipelines 114 on the manifold 112 and only one smaller sized pipeline 114, then it can be safely assumed that the smaller sized pipeline 114 is a distribution line 116, which may help speed up the temperature testing process further discussed below.

Reiterating what was mentioned before, there are at least three types of manifolds 112 that do not have any feed lines 116 (meaning water is flowing up this particular type of pipeline 114) and only have distribution lines 118 (meaning water is flowing down these particular pipelines 114). The manifold 112 dedicated to the cold water main entrance/inlet 108 only has water flowing down each line 114 in that cold main water manifold 112 and will not have any feedlines 116. The cold water main entrance/inlet 108 manifold 112 will only have distribution lines 118 in which the water flows down towards fixtures 122 on the property 104. Similarly, the manifold 112 dedicated to the hot water heater 110 also only has water flowing down each line 114 of the hot water heater manifold 112 and will not have any feedlines 116. The manifold(s) 112 for the hot water heater(s) 110 located on the property 104 will only have distribution lines 118 in which the hot water flows down to other fixtures 122.

Another unique exception is if there is a water softener on the property 104, then water will flow down each line 114 of the manifolds 112 dedicated to the water softener. If there is a water softener and a water softener loop, then there is a manifold 112 having a pipeline 114 for hard cold water and soft cold water. The pipelines 114 for the cold soft water will all have water flowing down and will be distribution lines 118.

Supply lines 120, as shown in FIG. 1 and in FIG. 4, refer to the often-flexible tubes and cables that run from the pipelines 114 of the manifolds 112 to a specific fixture 122. Each supply line 120 may have one or more control valves 124 attached to a first end of the supply line 120 that can be used to turn on and off water for the fixture 122 and control water flow to a specific fixture 122 at any time. For example, an angle stop valve is an example of a control valve 124 often used in household plumbing and is often found located against a wall near a fixture 122 (e.g., a toilet or sinks).

As shown in FIG. 1, every property 104 typically includes a cold water main entrance/inlet 108 with pressurized water being directed into the property 104 from the city or other location where the property owner 140 lives. Further, every property 104 usually includes at least one hot water heater 110. The hot water heater 110 has a pipe that feeds either directly/indirectly through a series of connected pipes from the cold water main entrance 108 to the hot water heater 110 carrying cold water. Further, there is at least one pipe that leaves the hot water heater 110 intended to carry hot water to the property 104 through the manifold 112 dedicated to the hot water heater 110. The hot water heater 110 is the only or main source of hot water on a property 104 but it is noted there may be more than one hot water heaters 110, especially on larger properties 140.

Further, manifolds 112 only have hot or cold water running through each manifold 112. Accordingly, there will be a manifold 112 with only cold water for a certain fixture 122 and another manifold 112 with only hot water for a certain fixture 122. The hot and cold pipes cannot be mixed for a manifold 112 because then the temperatures would be affected. It is noted that if there is a recirculating pump installed then hot and cold water may be mixed, but this is a unique exception. In general, the hot and cold pipes are not mixed on manifolds 112. Many fixtures 122 have both a hot manifold 112 and a cold manifold 112, such as, for example, showers, sinks, and/or washing machines, which are examples of fixtures 122 that use both hot and/or cold water. In some cases, if there is a water softener present on the property 104, there may be three different types of manifolds 112 which are 1) a manifold 112 containing and dedicated to transporting hard cold water 2) a manifold 112 containing and dedicated to transporting soft cold water and 3) a manifold 112 containing and dedicated to transporting soft hot water.

In some cases, cold water can flow through a manifold 112 intended for hot water. This can happen if the hot water heater 110 has ran out of hot water or if the inlet and outlet of the hot water heater 110 are connected to each other and not to the water heater 110 itself in which case the user 102 may have to heat up a hot water manifold 112 during testing as it is cold water that is actually flowing through it.

Notably, the builders of the property 104 do not mark or label the manifolds 112 or the pipelines 114 at the time of their installation on the property 104 with any visual marking that would indicate either the temperature of the water flowing through the pipelines, the direction of water flow, or which fixture 122 the manifolds 112 are distributing water to. In some rare cases, there may be some pipes, in particular, pipes that come out of the slab/foundation 106 that are covered in a thin colored plastic. The builder or other person marking the pipes can use a red plastic if the pipe is a hot pipe or a blue plastic if the pipe marked is a cold pipe, so that the marking process is color coded. However, one cannot rely at all on the accuracy of such color-coded sleeves as frequently they are incorrectly marked.

Further, there are no maps showing directions of pipelines and which fixtures are connected via which manifolds. Further, pipelines 114 may crisscross beneath the slab or foundation 106 and be organized to transport water in unexpected directions. For instance, a pipeline 114 on the left of an example manifold 112 may be distributing water to a right side of a property 104 and a pipeline 114 on the right of an example manifold 112 may be distributing water to a left side of a property 104, which is very unexpected. This is one of the reasons why the method 100, according to one or more non-limiting embodiments, as described herein is so important and useful. Normally, it is very difficult to ascertain which specific pipe 114 is leaking. As noted above, the manifolds 112 are concealed behind walls of the property 104 and the pipelines 114 are not marked and are not always logically organized and arranged. Further, the underground pipes connecting the pipelines 114 of the manifolds 112 are buried beneath or level with the foundation 106 and are not easily seen in order to ascertain visually where a leak 154 may be present.

It is noted that the manifold 112 and pipelines 114 that connect to the identified pipeline 126 containing the leak 154, as shown for example in FIG. 4, are shown and everything is clearly marked for the reader to see when referring to the present description. However, that is not the case in the real world. There are many duties and tasks that the user 102 has to accomplish in order to properly identify and detect the underground leaking pipe 126 using the one or more non-limiting embodiments of the method 100 described herein without the benefit of knowing in advance where the underground leaking pipe 126 is or where the pipelines 114 on each manifold 112 connect to (as well as to determine which pipelines 114 are feedlines 116 and which pipelines 114 are distribution lines 118.) Normally, to access manifolds 112, the user 102 has to open up walls of the property 104 using tools and cut into the finished walls which the property owner 140 may want to minimize to avoid damage to the walls of the property 104.

Figure 5:
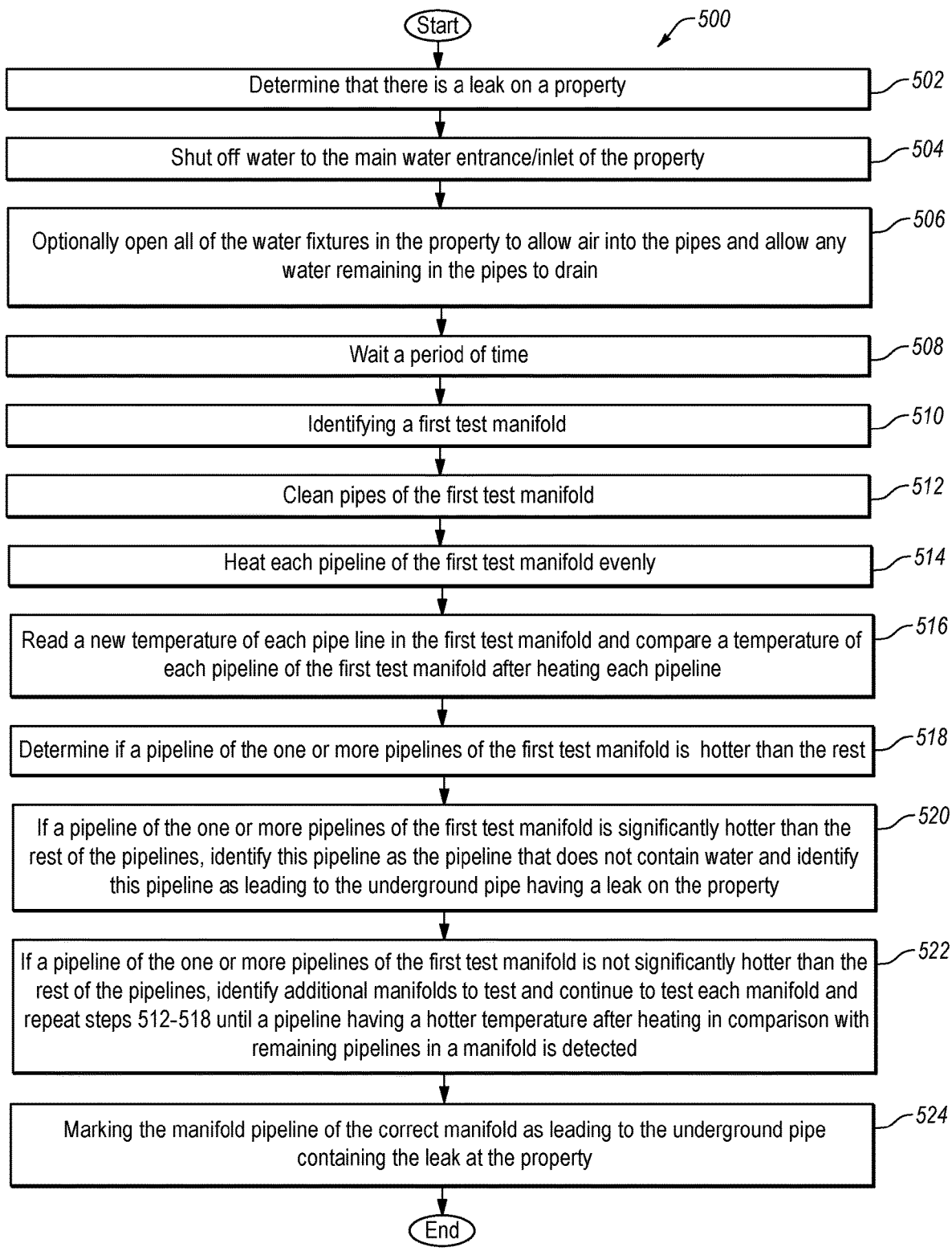
FIG. 5 is a flowchart of an exemplary method of identifying and detecting a slab leak in pipes that connect via manifolds on a property.

The flowchart in FIG. 5 provides a series of steps that the user 102 may perform to detect and identify the manifold 112 with the pipeline 114 leading to the underground pipe 126 having the leak 154 using the method 100 described herein. An important principle for detecting an underground leak 154 is that when there is an underground leak 154 in an underground leaking pipe 126, a controlled testing environment where the water supply from the city to the water main entrance 108 is turned off at a property 104, and no fixtures 122 have water flowing through the pipelines 114 through the fixture 122, there is still stagnant water in the pipelines 114 of the manifolds on the property 104. Notably, for the manifold pipeline 114 that leads to the underground leaking pipe 126 having the underground leak 154, the water will drain to the lowest point or to the underground leak 154 itself even when the water to the water main entrance 108 is shut off and no water is flowing through the fixtures 122 of the property 104.

As noted above, the testing for the method of the pipelines 112 has to be in a controlled environment. Accordingly, the method 100 involves the user 102 ensuring that the water inlet 108 is turned off. In this controlled testing environment, all that is required is for the pipes 114 to be pressurized. The city provides water directly to the user 102's property 104 via the cold-water main entrance/inlet 108. Thus, for the method 100 to work, the user 102 has to verify that the cold-water main valve 108 is turned off and that water pipes have pressure or are pressurized. It may be the case, in particular for ranches and farm style homes, that some property owners 104 are on a well type or similar system where they have their own pump and are creating their own pressure.

Notably, there should be stagnant water in the pipes of the property 104 and the user 102 can capitalize on this fact when implementing the method 100 as described herein in one or more non-limiting embodiments to attempt to detect and deduce where the underground leak 154 (which is usually not visible to the naked eye and located beneath or level with the slab or foundation 106) is located and more specifically, which detected pipeline 170 on the detected manifold 150 leads to the underground leak 154.

A notable underlying principle of the method and system 100 described herein is that if there is no leak 154, when the fixtures 122 are all off and not actively being used by a property owner 140 and/or user 102, stagnant water exists in the pipelines 114 of the property 104. Further, in the case where there is a leak 154 on a property 104, water will slowly flow through every pipe 114 of the specific manifolds 112 of the property 104 that directly leads to the leak 154, while every pipe 114 for the manifolds 112 not directly leading to the leak will still have stagnant (non-moving) water. Water may flow through the pipelines 114 at a low flow rate when there is a leak 154. The water in the property 104 will further be pressurized meaning that there are forces (e.g., gravity, altitude, other forces) that exert and act on the water in the pipes of the property 104 to push the water from the water main entrance 108 and/or hot water heater 110 through the pipes and larger plumbing system.

An important principle of the present method 100, as described in one or more non-limiting embodiments, is that a leak 154 in pressurized pipelines 114 (e.g., such as is the case with property 104) will continuously leak until the leak is repaired or fixed. Thus, any leaking pipe 126 will continually pull water towards that leak 154. Notably, water will never stop flowing to the leak 154 until the leak gets fixed and/or the water to the property is shut off. As a result, water from the city ends up flowing into the property 104 slowly only to escape through the leak 154. In some cases, in particular with above ground leaks, the leak 154 can plug itself but this is very, very rare.

As shown at FIG. 5, a first step for implementing method 100 is to determine if there is a leaking pipe 126 having a leak 154 on a property 104. This may be determined or deduced in a number of ways. As noted above, property owners 140 frequently contact plumbers who reach out to specialized leak detection companies to determine where the underground leaking pipe 126 is specifically located after noticing significantly higher water bills. In other cases, the property owners 140 may also start believing there may be an underground leaking pipe 126 and contact a plumber and/or specialized leak detection company after noticing pooling water and other structural issues in the walls or floors due to leaking water. The property homeowners 140 may also notice warm floors, hissing noises while no water is flowing from a fixture 122, mold and mildew, odd odors, as well as other signs of water damage. Often times, the city will contact the property owner 140 after noticing high consumption of water that there may be a leak 154 present.

Accordingly, once it has been determined that there may be an underground leaking pipe 126 with a leak 154 as shown at step 502 in FIG. 5 causing a disturbance in the normal plumbing system of the property 104, the next step as shown in FIG. 5 may be to shut off the water main entrance 108 to shut off any water flowing into the property 104 as shown at step 504. Next, at step 506, the method may optionally include opening or turning on all of the water fixtures 122 on the property to allow air into the pipes 114 and allow any stagnant water inside of the pipelines 114 to drain towards the leak 154. Step 506 may be considered a best practice or preferred embodiment but is not a requirement for the method to be implemented. It is noted that once the water main inlet 108 is turned off, the property 104 will still have pressure, however, the pressure will drop because water flowing into the pipelines 114, whereby the water notably causes the pressure, is going to escape through the underground leak 154 in the underground leaking pipeline 126.

At step 508, as shown in FIG. 5, the method may include waiting for a period of time. The minimum waiting period of time may range from a few seconds to a few minutes to 10 minutes. Notably, the user may need to wait between a short period of time (ranging from a few seconds to minutes) depending on whether the underground leak 154 is considered to be a small leak or a big leak. At step 510, the method may include identifying a first manifold 112 to test using the method 100 as described herein. At step 512, the method may further include optionally cleaning the manifold pipelines 114 of any unwanted elements covering the pipelines 114 that can interfere with an accurate temperature reading. Cleaning the pipes 114 may be achieved by using a piece of sandpaper or wire paper, a wire brush, a file, or an emery cloth in one or more non-limiting embodiments. Any other cleaning element may be used to scrape off any sludge, slime, gunk, concrete, plastic, or any other unwanted type of element located on the pipes 114 of the manifold 112. It is important to clean the pipes 114 because, if the user 102 attempts to temperature test or check the pipelines 114 of the first test manifold 112 or any type of manifold 112 and there is a lot of unwanted debris or elements on the pipelines, this may interfere with the accuracy of the test results. Accordingly, it may be important to clean the pipes of a manifold 112 as noted in step 512.

At step 514, the method may further include heating each pipeline 114 of the manifold 112 evenly using a heating tool or heating element 132. As shown in FIG. 1, the heating element or tool may be a blow torch in one or more non-limiting embodiments. Other examples of heating elements 132 that may be suitable include heat guns. FIG. 4 shows an example of a user 102 holding an exemplary blow torch 132 that is suitable for heating each pipeline 114 of a manifold 112.

After the user 102 has heated each pipeline 114 of the first test manifold 112 using a heating tool 132, the next step of the method 100 may be to read a temperature of each heated pipeline 114 of the first test manifold 112 and to compare the temperatures of each pipeline 114 of the first test manifold 112 after heating each pipeline 114, as shown at step 516. To read the temperature of each heated pipeline 114, the user 102 may choose to use his or her hands and sense of touch 142, as shown in FIG. 1. Using a user's sense of touch 142 may include feeling each manifold pipeline 114 to determine if one of the pipelines 114 is hotter to the touch than the other pipelines 114 after being heated with the heating tool 132. Additionally, or alternatively, the user 104 may choose to use temperature testing equipment 144, as shown in FIG. 1, which may include equipment such as thermometers, cameras, or temperature readers.

At step 518, the method may include determining if a single pipeline 114 of the manifold pipelines 114 of the first tested manifold 112 is significantly and noticeably hotter in comparison with the other manifold pipelines 114 after being heated with the heating elements 132. As noted above, the user 102 may be able to detect that a pipeline 112 is noticeably hotter than the remaining pipelines 114 because to the sense of touch 142 the user is able to detect that the pipeline 114 is hotter or the user 102 utilizes temperature testing equipment 114 such as, but not limited to, thermometers, cameras, and/or infrared guns that confirm the temperature of the pipeline 114. The infrared cameras may be used to tell temperature changes within the pipes 114 of the manifolds 112 without needing to physically touch them.

An important principle of the method 100 as described herein is that if water is present in all the pipelines 114 of the manifold 112, then the water will absorb some of the heat of the heating element 132 applied to the pipelines 114 of the tested manifold 112. However, if a pipeline 114 of a manifold 112 is connected to the underground leaking pipe 126, any water in that specific pipeline 114 will be drained towards to the underground leaking pipe 126 and will not be present in the pipeline 114 of the manifold 112. Accordingly, after this pipeline 114 is heated, the pipeline 114 will remain hotter than the other pipelines 114 of a manifold 112 due to the absence of stagnant water in the pipeline 114 to absorb the heat.

Accordingly, after step 518, in which the user has determined that a pipeline 114 of the tested manifold 112 is noticeably hotter than the remaining pipelines 114, then the method continues to step 520 in which the user can identify this pipeline 114 as not containing water and as leading to underground leaking pipe 126 on the property 104 containing the underground leak 154. Accordingly, the user 102 is able to deduce that this pipeline 114 is the detected pipeline 170 on the detected manifold 150 that leads to the underground leaking pipe 126 containing the leak 154.

At step 522, if none of the pipelines 114 of the initially tested manifold 112 are hotter than the others, then the user 102 can deduce that this manifold 112 does not likely lead to the underground leaking pipe 126. Accordingly, the steps 512-518 have to be repeated and the user 102 has to identify additional manifolds 112 to test. The user 102 may proceed throughout the property and identify additional manifolds 112 that may seem likely candidates for having pipelines 114 leading to the underground leak 154. As noted above, this may include the use of audio equipment 130 and/or utility locators 128.

Once the user 102 has identified an additional manifold 112 and repeated steps 512-518 to determine if a single pipeline 114 is hotter than the other pipelines 114 of the tested manifold 112, the user 102 may thereby deduce that this manifold 112 has the pipeline 114 leading to the underground leaking pipe 126.

At step 524, the method may include marking the manifold pipeline 114 of the correctly identified manifold 112 as being the detected manifold 150 as leading to the underground pipe 126 containing the leak 154 on the property 104. Marking the detected pipeline 170 may include marking with any kind of visual marking in order for the plumbing company or another company doing the subsequent reroute or repairs to be able to identify the correctly identified detected manifold 150 and pipeline 112 leading to the underground pipe 126 containing the underground leak 154. The pipeline 114 of the manifold 112 may be marked with tape or another visible discerning element, such as, but not limited to markers, cloth, or any other visible discerning element. Further, the user may take a photo of the pipeline 112.

Accordingly, the system and method 100 as described herein may utilize one or more other components shown in FIG. 1 to correctly detect and identify a detected pipeline 170 of a detected manifold 150 leading to the underground leaking pipe 126. In some instances, a user 102 may utilize a utility locator 128, as shown in FIG. 1 and in FIG. 2, as part of the system and method 100. A utility locator 128 is used to locate utilities beneath a slab or foundation 106. Utilities is a broad term that may refer to cables and/or pipes and indicates which fixtures 122 are connected via which pipes (e.g., pipelines 114 on a manifold 112). In a non-limiting example, the utility locator 128 may be a GOLDAK type pipe and cable locator/utility locator 128. Accordingly, in a non-limiting embodiment, the user 102 may utilize a utility locator 128 as a shortcut to speed up and simplify tracking and locating specific pipes under a slab or foundation 106 and to determine which fixtures that the pipes 114 run to. Notably, the method 100 as described herein does not absolutely require the use of a utility locator 128. The user 102 can still perform the method, as described herein according to one or more non-limiting embodiments, to correctly detect and identify underground leaking pipes 126 under a slab or foundation 106 and which pipelines 114 of a manifold 112 lead to the leaking pipes 126 without the use of a utility locator 128. The utility locator 128 may help identify quickly where various underground pipelines 114 lead to.

Figure 3:
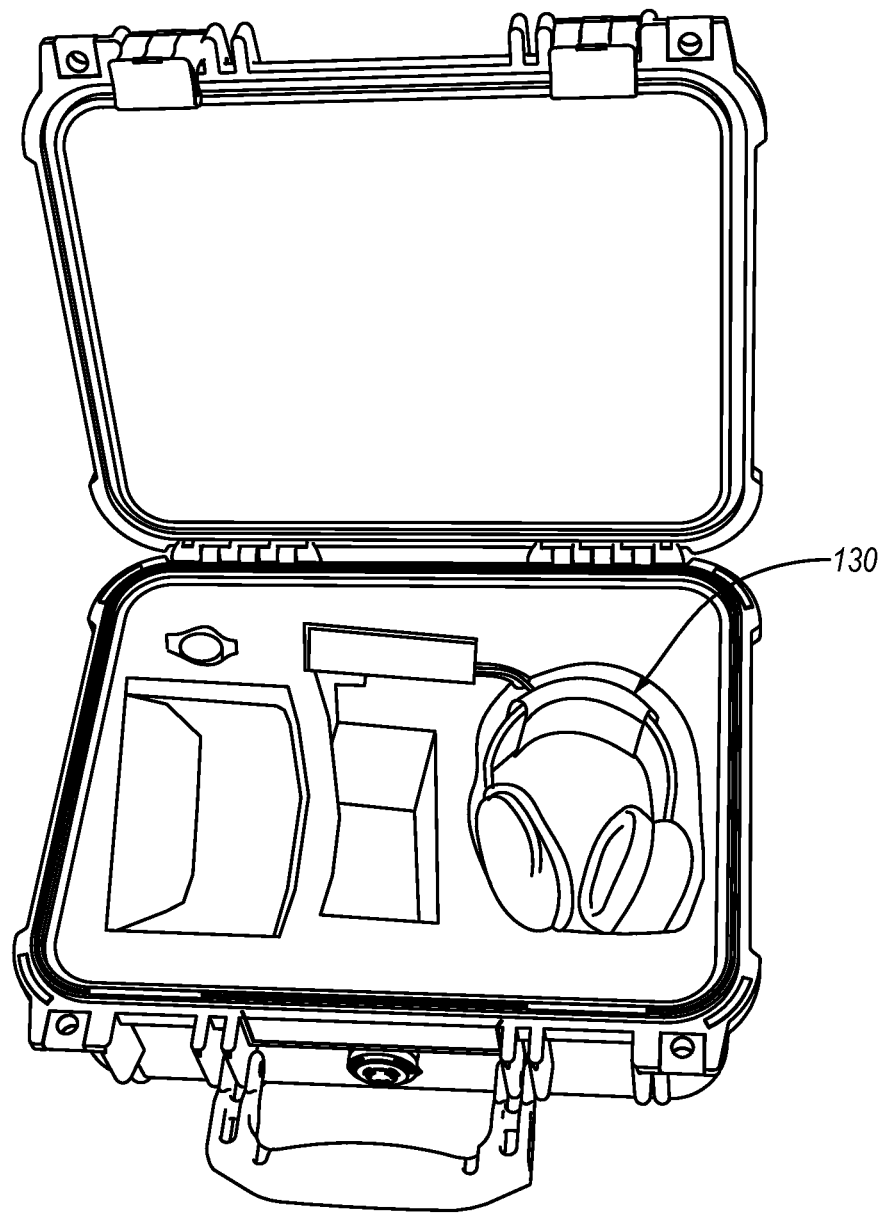
FIG. 3 is a pictorial illustration of an exemplary prior art audio equipment used to located leaking pipes.

Similarly, the user 102 may optionally utilize audio equipment 130 when detecting and identifying the leaking pipes 126. A non-limiting, prior art example of audio equipment 130 is shown in FIG. 3, which is an example of a SUBSURFACE INSTRUMENTS water leak detector. Audio equipment 130 may be ultrasonic and may include a microphone and a probe that can be used to listen to the floors of a property 104 or the pipelines 114 of the manifolds 112 to ascertain whether a leak 154 may be present in a particular location on the property 104. The user 102 may use the audio equipment 130 to listen for a prominent hissing sound. The loudest sound usually indicates that the user 102 is closest to the source of the leak 154. Because the manifolds 112 are made of metal pipes (usually copper but some other metals as well), it is useful to utilize audio equipment 130 to listen to the sounds through the floor of the property 104 or listening to the valves 124 directly with a probe from the audio equipment 130 to determine how water is flowing through the metal pipelines 114 and where the underground leaking pipe 126 may be located.

Normally, to listen directly to a manifold 112, the user 102 has to cut open the wall the manifold 112 is behind and expose the manifold 112. The user 102 can use the audio equipment 130 to listen to the angle stops (e.g., control valves 124) at the fixture 122 that each manifold 112 feeds, which may help avoid opening up walls and causing some damage to the walls in the testing process. For example, the user 102 can listen to an angle stop 124 as it is exposed on the outside for easy access. Control valves 124 are usually set up such that the hot valve 124 may be on the left side and the cold valve 124 for a fixture 122 is on the right side. So, the user 102 can usually safely assume the control valve 124 on the left is connected to the hot water lines 114 while the control valve 124 on the right is connected to the cold-water pipelines 114 throughout the property 104 and listen to the control valves 124 to determine if a hissing sound is more prominent on the hot side or the cold side based on the respective control valve 124.

Accordingly, the user 102 can also use the probe to listen for the loudest sound by listening to the valves 124 on a particular hot pipeline or cold pipeline 114 that may have the leak 154. In a non-limiting embodiment, the user 102 can listen to every shut off valve 124 on the property 104. In the exemplary, non-limiting case in which the leak 154 proves to be on the hot side, it may be the case that the hot control valves 124 will have some noise while none of the cold valves 124 will have noise that can be audibly discerned by the audio equipment 130, indicating that the leak 154 is on the hot water side. Further, it is likely that the user 102 will hear the noise from the pipes 114 loudest in a particular bathroom of a property 104 (in this exemplary, non-limiting case) and thus can start testing that manifold 112 in that bathroom instead of other areas. Thus, the audio equipment 130 can help speed up the process of identifying where to start testing and which walls to open to expose the hidden manifolds 112 behind the walls in a particular location of the property 104. A user may try to locate the loudest sound or loudest sounding pipeline 114 and begin to perform the steps of the method 100 as shown and as described in FIG. 5.

Further, the user 102 can also use audio equipment 130 to listen to the floors to try and hear where there is the loudest sound (i.e., which is a clue that the leak 154 is located there). If the user 102 listens to the floor of the bathroom, for example, and hears the loudest noise coming from the bathroom, the user 102 can start testing the manifolds 112 in the bathroom versus other areas of the house. This may be a way to identify the first test manifold 112 that the user 102 starts with to determine the location of the leak 154 and the pipe 126 containing the leak 154.

Generally, it is safe to assume that the area of the property 104 with the loudest sounds heard through the floors or walls or control valves 124 (whether or not audio equipment 130 is used) must have the leak 154 nearby. Accordingly, the user 102 may use the ultrasonic audio equipment 130 to listen for the loudest sound (e.g., hissing noise) and start testing the manifold 112 near there. The use of audio equipment 130 may significantly expedite how quickly the detection job is finished. Further, the user 102 can test each manifold 112 one by one and figure out which pipe 114 has the leak 154. The utility locator 128, as noted above and shown in one example in FIG. 2, helps to also expedite the process and reduce cutting into walls of the property 104 because the utility locator 128 helps show where the pipes 114 lead to, which can make the method and system 100 to detect and identify a test manifold 112 likely to include the pipeline 114 of interest so the user 102 can open up smaller holes in the wall instead of tearing out large sections. A utility locator 128 can be used to show the user 102 where lines 114 are going and coming from. This can help the user 102 eliminate time temperature testing and the process of elimination test for identifying which fixtures are connected to which distribution lines 118 of which manifolds 112, and track where the pipelines 114 are directed to.

Notably, there are multiple ways to do an audio test (listen to the pipes) including hearing the leak 154 with the user 102's bare ear, using ultrasonic acoustical equipment 130, and even putting a long screwdriver or another long piece of metal on the angle stops and control valves 124.

Notably, the method 100 as described herein may be performed without the use of a utility locator 128 and/or audio equipment 130. There are a number of alternative options the user 102 may turn to in trying to identify the first testing manifold 112. The user 102 may identify all fixtures 122 that use water (e.g., dish washing machines, washing machines, sinks, toilets, and showers) and then look for signs of leaking around each fixture 122. Exemplary signs of leaking may include pooling water or stagnant water around the fixture 122. Other signs of leaking may include warm floors. If there are warm floors in a specific location of a property 104, the user 102 can safely start testing at that location using method 100 with the safe assumption that the leak 154 is near this location. User 102 may also use thermometers, infrared cameras, and other heat detection equipment including the user 102's bare hands and feet to feel warm spots on the floor. Warm floors are an indication of a slab leak on the hot water side. Warm floors on the property 104 (in the absence of floors that are heated through other intentional means) usually indicate an underground leaking pipe 126 is present and the leak 154 is in a hot water pipe 114 as opposed to a cold water pipe 114. Sometimes there is an audible sound in a bathroom or other location of the house or other type of property 104 that is sufficiently loud, it becomes clear that the leak 154 is at the same location or at least very near to where the underground leaking pipe 126 is located and the user 102 can safely identify one or more manifolds 112 in that area as a first test manifold 112 and location to start testing to narrow down and find detected pipeline 170 and detected manifold 150.

As an alternative to using utility locators 128, audio equipment 130, and/or temperature testing equipment 144, in a one-story house, a user 102 can open up under every fixture 122 to find a manifold 112 if needed and use the detection method 100 as further described below.

Advantageously, the method 100 described herein provides an efficient method for locating and detecting a pipeline 170 in a manifold 150 that leads to an underground leaking pipe 126 and an underground leak 154. Many additional advantages and uses are offered by the one or more systems described herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, or steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may mean a direct or indirect connection via one or more components.

What is claimed is:

1. A method for identifying an underground pipe containing a leak at a property, comprising:
   a. ensuring that a main water inlet valve to the property is shut off and that potable water is not able to flow into the property if any water fixtures are opened or turned on;
   b. identifying a first manifold to test on the property, wherein the first manifold comprises a set of manifold pipelines to begin testing to identify a location of and detect the underground pipe containing the leak at the property;
   c. optionally cleaning each manifold pipeline of the set of manifold pipelines;
   d. heating up each manifold pipeline of the set of manifold pipelines evenly using a heating tool;
   e. after heating up each manifold pipeline, reading a temperature of each manifold pipeline and comparing the temperature of each manifold pipeline to each other;
   f. if a single manifold pipeline of the set of manifold pipelines of the first test manifold is hotter than other manifold pipelines of the set of manifold pipelines, determining that the single manifold pipeline does not contain water which is an indication that that any water remaining in the single manifold pipeline has escaped through the single manifold pipeline to the underground pipe containing the leak on the property;
   g. marking the single manifold pipeline of the first manifold with a visible marker;
   h. if the single manifold pipeline of the set of manifold pipelines of the first test manifold is not hotter than the other manifold pipelines of the set of manifold pipelines, determining that all of the manifold pipelines of the set of manifold pipelines of the first test manifold contain water even when the potable water to the property is shut off and that the first manifold does not include a manifold pipeline leading to the underground pipe containing the leak at the property;
i. repeating steps (c)-(f) on additional manifolds on the property to test until identifying a correct manifold having a detected manifold pipeline that reads hotter than other manifold pipelines of the correct manifold after being heated;
j. identifying the detected manifold pipeline of the correct manifold as leading to the underground pipe containing the leak at the property; and
k. marking the detected manifold pipeline of the correct manifold as leading to the underground pipe containing the leak at the property.

2. The method of claim 1, wherein the heating tool comprises a torch, a heat gun, or another heating tool.

3. The method of claim 1, wherein reading the temperature in step (E) further comprises using touch, vision, or temperature testing equipment.

4. The method of claim 3, wherein the temperature testing equipment further comprises using thermometers, cameras, or temperature readers.

5. The method of claim 3, wherein using touch further comprises:
feeling each manifold pipeline in a manifold with a user's hands or other part of the user's body to assess the temperature of each manifold pipeline.

6. The method of claim 1, wherein identifying the first manifold to test in step (B) further comprises:
checking for any clear signs of where the leak could be located and proceeding to an identified location on the property having the water fixtures and manifolds closest to a location of the any clear signs, wherein the any clear signs comprise flooding, pooling water, warm floors, hissing noises that can be heard with a user's bare ears, or a loud sound detected using audio equipment.

7. The method of claim 1, further comprising using audio equipment to identify the first manifold or the additional manifolds to test on the property.

8. The method of claim 7, further comprising listening for a loud hissing noise using the audio equipment.

9. The method of claim 1, wherein optionally cleaning each pipeline in step (C) further comprises using a file, an emery cloth, a piece of sandpaper, a wire brush, or other tool to clean off any sludge, slime, concrete, plastic or any other unwanted elements that interfere with obtaining an accurate temperature reading.

10. The method of claim 1, further comprising utilizing a utility locator to locate pipes located underground a slab or a foundation on the property in order to determine the first manifold to test or the additional manifolds to test on the property.

* * * * *